United States Patent
Hecker et al.

(10) Patent No.: US 10,773,647 B2
(45) Date of Patent: Sep. 15, 2020

(54) METHOD FOR TRIGGERING AN AUTOMATIC EMERGENCY BRAKING PROCESS WITH VARIABLE WARNING TIME PERIOD

(71) Applicant: KNORR-BREMSE SYSTEME FUER NUTZFAHRZEUGE GMBH, Munich (DE)

(72) Inventors: Falk Hecker, Markgröningen (DE); Ulrich Gücker, Schwieberdingen (DE); Matyas Krabot, Szigetszentmiklos (HU); Markus Klein, Pforzheim (DE); Csaba Doczy, Budapest (HU); Gergely Jozsa, Budapest (HU); Tamas Rozsa, Budapest (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 121 days.

(21) Appl. No.: 15/558,870

(22) PCT Filed: Mar. 16, 2016

(86) PCT No.: PCT/EP2016/055724
§ 371 (c)(1),
(2) Date: Sep. 15, 2017

(87) PCT Pub. No.: WO2016/162178
PCT Pub. Date: Oct. 13, 2016

(65) Prior Publication Data
US 2018/0072224 A1    Mar. 15, 2018

(30) Foreign Application Priority Data

Mar. 26, 2015  (DE) .................. 10 2015 104 547

(51) Int. Cl.
*B60Q 9/00* (2006.01)
*B60T 8/171* (2006.01)
(Continued)

(52) U.S. Cl.
CPC ............ *B60Q 9/008* (2013.01); *B60Q 5/006* (2013.01); *B60T 7/22* (2013.01); *B60T 8/17* (2013.01);
(Continued)

(58) Field of Classification Search
CPC ....... B60Q 9/008; B60Q 5/006; G01S 13/931; G01S 2013/9346; B60T 8/32; B60T 8/58;
(Continued)

(56) References Cited

U.S. PATENT DOCUMENTS

| | | | |
|---|---|---|---|
| 5,278,764 A * | 1/1994 | Lizuka et al. | ............ B60T 7/22 |
| | | | 701/301 |
| 5,594,414 A * | 1/1997 | Namngani | ............ G01S 13/931 |
| | | | 701/301 |

(Continued)

FOREIGN PATENT DOCUMENTS

| | | |
|---|---|---|
| DE | 102014008431 A1 | 11/2014 |
| EP | 1539523 B1 | 6/2005 |
| JP | 2005225447 A | 8/2005 |

OTHER PUBLICATIONS

International Search Report dated May 20, 2016, of the corresponding International Application PCT/EP2016/055724 filed Mar. 16, 2016.

*Primary Examiner* — Dale W Hilgendorf
(74) *Attorney, Agent, or Firm* — Norton Rose Fulbright US LLP; Gerard Messina

(57) ABSTRACT

The present invention relates to a method and device for triggering an automatic emergency braking process in a vehicle to avoid a tail-end collision with an obstacle,
(Continued)

wherein a warning to the driver is triggered if at least one warning condition is satisfied, wherein the satisfaction of the warning condition specifies that owing to the instantaneous driving situation of the vehicle relative to the obstacle the automatic emergency braking process should be triggered, wherein the automatic emergency braking process is not triggered until after the warning to the driver is triggered and a warning time period has subsequently expired, wherein the warning time period is set as a function of the relative movement situation between the vehicle and the obstacle and/or is adapted as a function of a relative movement, which changes over time, between the vehicle and the obstacle.

11 Claims, 1 Drawing Sheet

(51) Int. Cl.
| | |
|---|---|
| *G05D 1/02* | (2020.01) |
| *B60T 8/58* | (2006.01) |
| *B60T 8/32* | (2006.01) |
| *G01S 13/931* | (2020.01) |
| *B60T 7/22* | (2006.01) |
| *B60Q 5/00* | (2006.01) |
| *B60T 8/17* | (2006.01) |

(52) U.S. Cl.
CPC .............. *B60T 8/171* (2013.01); *B60T 8/32* (2013.01); *B60T 8/58* (2013.01); *G01S 13/931* (2013.01); *G05D 1/0289* (2013.01); *B60T 2201/022* (2013.01); *G01S 2013/93185* (2020.01)

(58) Field of Classification Search
CPC ... B60T 8/171; B60T 8/17; B60T 7/22; B60T 2201/022; G05D 1/0289
See application file for complete search history.

(56) References Cited

U.S. PATENT DOCUMENTS

| | | | |
|---|---|---|---|
| 6,021,375 A * | 2/2000 | Urai et al. | B60T 7/22 |
| | | | 701/301 |
| 6,294,987 B1 * | 9/2001 | Matsuda et al. | B60T 7/12 |
| | | | 701/301 |
| 7,425,043 B2 * | 9/2008 | Doerr et al. | B60Q 5/006 |
| | | | 701/301 |
| 7,797,107 B2 * | 9/2010 | Shiller | G01S 13/931 |
| | | | 701/301 |
| 8,146,703 B2 * | 4/2012 | Baumann et al. | B60T 7/22 |
| | | | 180/275 |
| 2005/0171681 A1 * | 8/2005 | Yang et al. | B60Q 5/006 |
| | | | 701/116 |
| 2006/0097570 A1 | 5/2006 | Doerr et al. | |
| 2009/0038873 A1 | 2/2009 | Lucas et al. | |
| 2015/0232090 A1 * | 8/2015 | Jeon et al. | B60T 7/22 |
| | | | 701/1 |

* cited by examiner

METHOD FOR TRIGGERING AN AUTOMATIC EMERGENCY BRAKING PROCESS WITH VARIABLE WARNING TIME PERIOD

FIELD OF THE INVENTION

The present invention relates to a method for triggering an automatic emergency braking process in a vehicle in order to avoid a tail-end collision with an obstacle such as a vehicle traveling ahead, wherein a warning to the driver is triggered if at least one warning condition is satisfied, wherein the satisfaction of the warning condition specifies that owing to the instantaneous driving situation of the vehicle relative to the obstacle the automatic emergency braking process should be triggered, wherein the automatic emergency braking process is not triggered until after the warning to the driver is triggered and a warning time period has subsequently expired.

Furthermore, the present invention relates to a device for carrying out an automatic emergency braking process in a vehicle in order to avoid a tail-end collision with an obstacle such as a vehicle traveling ahead, wherein an evaluation apparatus triggers a warning to the driver if at least one warning condition which is stored in the evaluation apparatus is satisfied, wherein the satisfaction of the warning condition specifies that owing to the instantaneous driving situation of the vehicle relative to the obstacle the automatic emergency braking process should be triggered, wherein the automatic emergency braking process is not triggered by the evaluation apparatus until after the warning to the driver is triggered and a warning time period has subsequently expired.

BACKGROUND INFORMATION

The patent document of EP 1 539 523 B1 discusses how the automatic emergency braking process is not triggered until after a warning time period has expired, during which time period the driver is provided with the possibility of avoiding the automatic emergency braking process by intervening in the form of a driver's braking request. The warning time period is divided here chronologically into two stages, wherein according to a first warning stage time period a visual and/or acoustic warning to the driver is issued. If the driver does not react thereto, within the scope of a second warning stage time period a partial braking operation is initiated with a partial braking deceleration which is less than a predefined (maximum) emergency braking deceleration. The emergency braking process is triggered automatically only if the driver also allows the second warning stage time period to pass without activating the brake. Within the scope of the warning time period, the driver therefore has the possibility of averting the hazard situation by activating the brake.

In this context, the warning time period is permanently predefined or is set as a function of the vehicle mass, the coefficient of friction of the lining of the wheel brake apparatuses of the vehicle, the condition of the underlying surface or the visibility conditions.

SUMMARY OF THE INVENTION

In view of the above, the present invention is based on the object of adapting the method of the generic type or the device of the generic type better in respect of the present traffic situation.

This object is achieved according to the invention by the description provided herein. Advantageous developments of the invention are the subject matter of the further descriptions herein.

The method according to the invention provides that the warning time period is set as a function of the relative movement situation between the vehicle and the obstacle and/or is adapted as a function of a relative movement situation, which changes over time, between the vehicle and the obstacle.

According to the invention, the evaluation apparatus is configured that it sets the warning time period as a function of the relative movement situation between the vehicle and the obstacle and/or adapts said warning time period as a function of a relative movement situation, which changes over time, between the vehicle and the obstacle.

An obstacle is understood either to be a fixed, stationary obstacle, an obstacle in the form of a vehicle traveling ahead or a vehicle which cuts into the lane of the respective vehicle, in front of said vehicle, or a vehicle which intersects the lane of the respective vehicle at an arbitrary angle.

In other words, the warning time period is not permanently predefined as in EP 1 539 523 B1 which is specified at the beginning, nor is it set merely as a function of variables such as the mass of the vehicle, the coefficient of friction of the linings of the wheel brake apparatuses of the vehicle, the condition of the underlying surface or the visibility conditions which do not relate to the stationary obstacle or the vehicle which is cutting in or traveling ahead, but instead said time period actually relates to variables which relate to the relative movement situation between the vehicle and the obstacle. This results in a variable or dynamic warning time period which is better adapted to the respective traffic situation. The warning time period is therefore advantageously then adapted to the currently prevailing traffic situation of the vehicle with respect to the obstacle.

If, for example, the obstacle, e.g. in the form of a vehicle traveling ahead, decelerates, the warning time period is, for example, shortened in comparison with a predefined or set initial warning time period on the basis of the relative movement situation which is then present between the vehicle and the obstacle. This is because after the expiry of the warning time period the emergency braking process takes place with a maximum emergency braking deceleration, which requires a certain emergency braking deceleration time in order to maintain a safety distance from the obstacle, so that in this case there is less intervention time (warning time period) available for the driver. If in such a case a warning time period were fixedly predefined independently of the relative movement situation, there would be the risk of said warning time period being too long and of the respective vehicle consequently colliding with the obstacle.

In contrast to this, the warning time period is, for example, extended if the obstacle, e.g. in the form of a vehicle traveling ahead, accelerates. This is because in this case there is more time available to the driver to actively intervene with a braking maneuver.

Advantageous developments and improvements of the invention are possible by virtue of the measures specified in the dependent claims.

For example, an initial warning time period at the time of triggering of the warning to the driver is set on the basis of the relative movement situation, which is present at this time, between the vehicle and the obstacle, and is then no longer changed, i.e. in the further course of said movement situation. In other words, the warning time period is set once at the time of triggering of the warning to the driver, on the basis of the relative movement situation, which is present at this time, between the vehicle and the obstacle, and is then no longer changed.

According to one alternative procedure there can be provision that on the basis of the initial warning time period which is predefined at the time of the triggering of the warning to the driver or only on the basis of the relative movement situation which is present between the vehicle and the obstacle at this time, the warning time period is adapted after the triggering of the warning to the driver has already taken place, as a function of the relative movement situation which is then respectively present between the vehicle and the obstacle. In other words, in this case a warning time period which is fixedly predefined or is set on the basis of the relative movement situation, which is present at the time, between the vehicle and the obstacle and during which the warning to the driver is triggered is adapted as a function of the relative movement situation, which is present after this time, between the vehicle and the obstacle. Such an adaptation can take place, in particular, once or at specific time intervals or repeatedly in a cyclical fashion.

According to one development of this alternative procedure, in the event of the obstacle decelerating after the triggering of warning to the driver, the warning time period is shortened in comparison with the initial warning time period on the basis of the relative movement situation which is then present changed, between the vehicle and the obstacle. Then, owing to a limited emergency braking deceleration time the driver has less intervention time available as already been explained above.

Otherwise, that is to say if the obstacle accelerates after the triggering of the warning to the driver, the warning time period is lengthened in comparison with the initial warning time period, on the basis of the relative movement situation which is then present and changed between the vehicle and the obstacle. This is because more intervention time then remains to the driver without there being a risk of the vehicle colliding with the obstacle.

Since the evaluation of sensor data and sensors in the evaluation apparatus, which detects the relative movement situation between the vehicle and the obstacle, generally takes place cyclically, i.e. at specific time intervals, the warning time period may also be set or adapted cyclically.

At least one of the following variables may be taken into account in the relative movement situation between the vehicle and the obstacle, wherein the enumeration is not complete: the speed and/or the acceleration of the vehicle in the direction of travel and/or transverse with respect to the direction of travel, the speed and/or the acceleration of the obstacle in the direction of travel and/or transverse with respect to the direction of travel, the relative speed and/or the relative acceleration between the vehicle and the obstacle in the direction of travel and/or transverse with respect to the direction of travel, the distance between the vehicle and the obstacle in the direction of travel and/or transverse with respect to the direction of travel. The term "in the direction of travel and/or transverse with respect to the direction of travel" is also to be understood as referring to a direction at a random angle with respect to the direction of travel.

The warning time period particularly may include as a total warning time period a first warning time period and a second warning time period, wherein visual and/or acoustic signals are output during the first warning time period, and a partial braking operation with a partial braking deceleration less than a maximum emergency braking deceleration is carried out within the scope of the second warning time period which is immediately subsequent to the first warning time period.

According to one development of this embodiment, the total warning time period and/or the first warning time period and/or the second warning time period are/is set as a function of the relative movement situation between the vehicle and the obstacle and/or are/is adapted as a function of a relative movement situation, which changes over time, between the vehicle and the obstacle. Here, the first warning time period is, for example, fixedly predefined.

The invention also relates to a vehicle having a device as described above.

The invention will be described in more detail below on the basis of an exemplary embodiment and with reference to the appended drawings.

DETAILED DESCRIPTION

Figure 1:
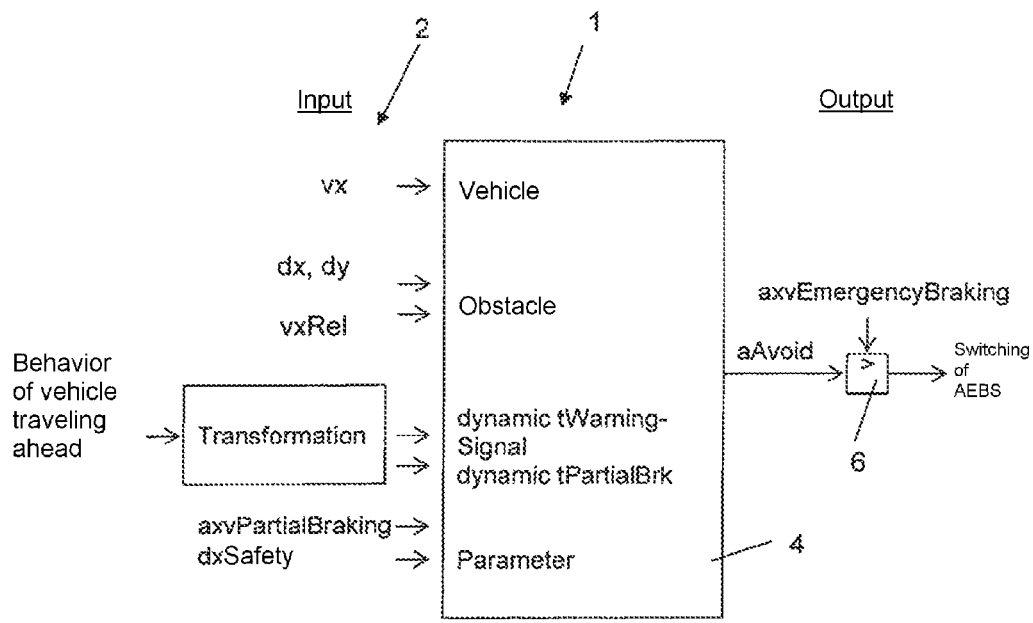
FIG. 1 shows a schematic flow chart of an exemplary embodiment of the method according to the invention.

The flow chart, shown in FIG. 1, of an exemplary embodiment of a method for triggering an automatic emergency braking process in a vehicle in order to avoid a tail-end collision with an obstacle generally includes triggering of a warning to the driver if at least one warning condition is satisfied, wherein the satisfaction of the warning condition specifies that owing to the instantaneous driving situation of the vehicle relative to the obstacle the automatic emergency braking process should be triggered.

The automatic emergency braking system (AEBS) and process is, however, not triggered until after the warning to the driver is triggered and a total warning time period tWarning has subsequently expired. In other words, the driver is provided with the opportunity, within a total warning time period tWarning by the warning to the driver, e.g. in the form of visual or acoustic signals, to brake the vehicle by a braking intervention which is initiated by the driver, without the automatic emergency braking process being subsequently triggered. If, on the other hand, the driver fails, for example in the form of braking, steering, activating flashing indicator lights, carrying out a kick down activation of the accelerator pedal or switching off the AEBS function, within the total warning time period tWarning, to react to the warning to the driver the automatic emergency braking process is triggered. This function is also referred to as an AEBS function and can be activated or deactivated by an AEBS switch.

Firstly, the instantaneous driving situation of the vehicle and, in particular, a relative movement situation is detected with respect to an obstacle, here for example with respect to a vehicle driving ahead. For this purpose, the vehicle has a device 1 for carrying out an automatic emergency braking process, which device 1 include a sensor apparatus 2 which detects a relative movement situation between the vehicle and an obstacle such as a vehicle traveling ahead, wherein here, for example, the speed $v_x$ of the vehicle in the direction of travel x is detected as a variable relating to the vehicle itself (vehicle in question), and the distance dx, dy of the vehicle from the vehicle traveling ahead in the direction of travel x and in transverse direction y thereto as well as the relative speed $V_{xRel}$ in the direction of travel of the vehicle with respect to the vehicle traveling ahead are detected as variables relating to the obstacle. These variables are input into an evaluation apparatus 4.

Furthermore, a partial braking deceleration $a_{xvPartialBraking}$ in the direction of travel x and a safety distance $d_{xSafety}$ of the vehicle with respect to the vehicle traveling ahead in the direction of travel x are read in into the evaluation apparatus 4 as predefined variables (parameters), e.g. from a memory. The partial braking deceleration $a_{xvPartialBraking}$ is used as, for example, a predefined variable within the scope of a second warning stage of a warning to the driver which will be explained in more detail below. The safety distance $d_{xSafety}$ of the vehicle with respect to the vehicle traveling ahead in the direction of travel x represents a distance which is to be reached and which can be reached either by a braking process which is initiated by the driver and/or by an automatically triggered emergency braking process.

Moreover, a dynamic first warning time period tWarningSignal and a dynamic second warning time period tPartialBrk are determined from the previous behavior of the vehicle traveling ahead on the basis of the variables detected by the sensor apparatus 2. Dynamic means that the two warning time periods tWarningSignal and tPartialBrk are not fixedly predefined but instead constitute variables which can be set or adapted. The basis on which the setting or adaptation can take place will be explained in more detail below.

While the dynamic first warning time period tWarningSignal specifies that during this time period a visual and/or acoustic signal is generated by a signal apparatus in order to prompt the driver time to intervene, for example by active braking, by steering, activating a flashing indicator light, carrying out kick down activation of the accelerator pedal or switching off the AEBS function on the AEBS switch, the dynamic second warning time period tPartialBrk constitutes a time period during which the evaluation apparatus 4 transmits a signal to a brake apparatus (not shown here) in order to trigger a partial braking operation with a partial braking deceleration which is less than a maximum emergency braking deceleration which acts, for example, within the scope of the automatically triggered emergency braking process.

Figure 2:
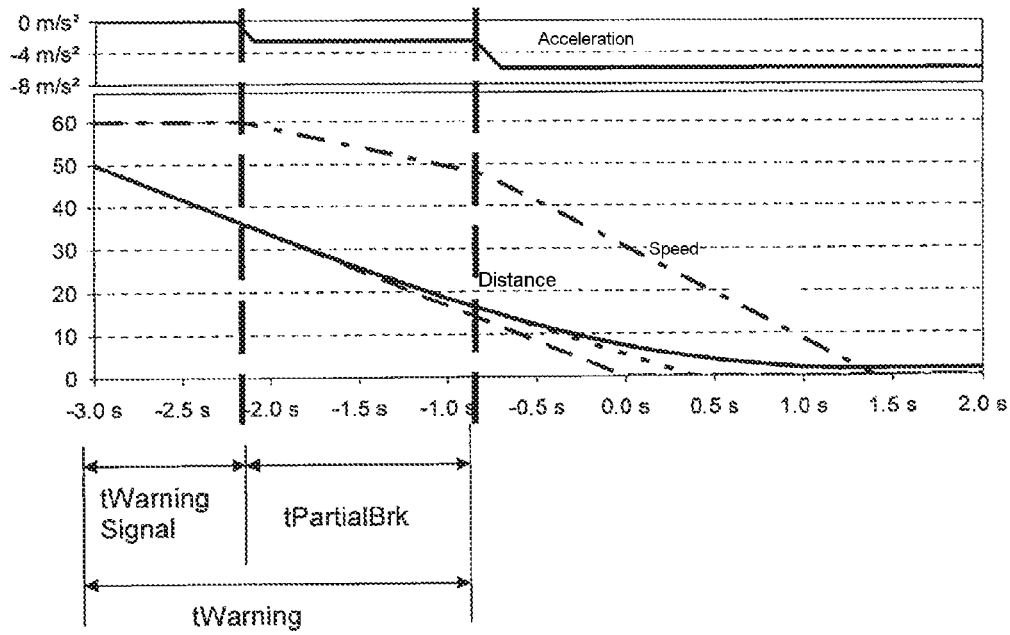
FIG. 2 shows a diagram on which the acceleration a and the speed v of a vehicle and the distance d from a vehicle traveling ahead are plotted as a function of the time t after the triggering of a warning to the driver.

As is apparent from FIG. 2, the first warning time period tWarningSignal is arranged chronologically before the second warning time period tPartialBrk, during which first warning time period tWarningSignal the driver is provided, by a visual and/or acoustic signal of a signal apparatus (not shown here) controlled by the evaluation apparatus 4 by a corresponding electrical signal, with a message to intervene, for example by active braking, by steering, activating a flashing indicator light, carrying out kick down activation of the accelerator pedal or switching off the AEBS function on the AEBS switch.

If the driver reacts within the first warning time period tWarningSignal and e.g. to bring about by active braking or steering at least the safety distance $d_{xSafety}$ of the vehicle with respect to the vehicle traveling ahead in the direction of travel x and/or transverse with respect thereto, the method is ended. However, if the driver does not react, or does not react to a sufficient extent, the dynamic second warning time period tPartialBrk is automatically actuated, during which warning time period tPartialBrk the evaluation apparatus transmits, without the driver's involvement, a signal to the brake apparatus in order to trigger a partial braking operation with the partial braking deceleration. Only if the driver does not react to this haptically detectable partial braking or does not react sufficiently, for example by active braking, steering, activation of the flashing indicator light, by carrying out kick down activation of the accelerator pedal or by switching off the AEBS function on the AEBS switch, does the evaluation apparatus 4 then transmit, to the brake apparatus, a signal which triggers an emergency braking process with a maximum emergency braking deceleration or with a deceleration which is, for example, regulated according to demand.

The dynamic total warning time period tWarning is accordingly composed of a dynamic first warning time period tWarningSignal and a dynamic second warning time period tPartialBrk. A timer which is integrated into the evaluation apparatus monitors the expiry of the total warning time period tWarning or of the first warning time period tWarningSignal or the second warning time period tPartialBrk.

The evaluation apparatus determine a collision avoidance deceleration aAvoid from the detected input variables, with which collision avoidance deceleration aAvoid the vehicle would have to be braked in order to reach at least the necessary safety distance $d_{xSafety}$ of the vehicle with respect to the vehicle traveling ahead in the direction of travel x. In a comparator 6 of the evaluation apparatus 4, the determined value for the collision avoidance deceleration aAvoid is compared with an emergency braking deceleration axvEmergencyBraking, which, for example, is the maximum which the brake apparatus of the vehicle can supply. The emergency braking deceleration axvEmergencyBraking constitutes, in particular, a fixed predefined threshold value.

If the comparator 6 detects that the determined value for the collision avoidance deceleration aAvoid is less than or equal to the emergency braking deceleration axvEmergencyBraking, a warning to the driver is not triggered in combination with an automatic emergency braking process. If, on the hand, the determined value for the collision avoidance deceleration aAvoid is higher than the emergency braking deceleration axvEmergencyBraking, the warning to the driver is actuated with a total warning time period (tWarning) an emergency braking process is eventually automatically triggered (trigger of AEBS).

The evaluation apparatus 4 is also configured in such a way that the steps described above for the detection of the variables, calculation, comparison etc. are run through in cycles or cyclically, with the result that when the method is activated or when the device is activated corresponding collision monitoring takes place continuously.

As already indicated above, the first warning time period tWarningSignal and/or the second warning time period tPartialBrk are/is set dynamically as a function of the relative movement situation between the vehicle and the vehicle traveling ahead and/or are/is adapted dynamically as a function of a relative movement situation, which changes over time, between the vehicle and the obstacle. This dynamic adaptation then also applies to the total warning time period tWarning which is composed, of course, of the two warning time periods tWarningSignal and tPartialBrk.

The setting or adaptation of the total warning time period tWarning and/or of the first warning time period tWarningSignal and/or of the second warning time period tPartialBrk means that this variable or these variables is/are set on the basis of the relative movement situation between the vehicle and the vehicle traveling ahead which is present at the time of the detected result of the comparison made in the comparator 6, that the collision avoidance deceleration aAvoid is greater than the emergency braking deceleration axvEmergencyBraking.

If, for example, the vehicle traveling ahead travels ahead of the vehicle in question for a certain time period at a distance which does not require any intervention whatsoever on the part of the evaluation apparatus, i.e. an automatic emergency braking process in combination with a preceding warning time is not necessary, a (then theoretical) total warning time period tWarning and/or first warning time period tWarningSignal and/or second warning time period tPartialBrk are/is nevertheless determined as output values/an output value.

If after a certain time period the vehicle traveling ahead decelerates, the total warning time period tWarning and/or the first warning time period tWarningSignal and/or the second warning time period tPartialBrk are/is shortened in comparison with the output value/values, on the basis of the then changed relative movement situation between the vehicle and the vehicle traveling ahead. In contrast to this, the total warning time tWarning and/or the first warning period tWarningSignal and/or second warning time period tPartialBrk are/is lengthened if the vehicle traveling ahead accelerates.

The values for the total warning time period tWarning and/or for the second warning time period tPartialBrk, which are determined or adapted at the time at which it is detected that the collision avoidance deceleration aAvoid is greater than the emergency braking deceleration axvEmergencyBraking, are then, for example, maintained within the scope of the immediately subsequent phase of the triggered warning to the driver.

According to one alternative procedure, there can be provision that on the basis of initial values for the total warning time period tWarning and/or for the first warning time period tWarningSignal and/or for the second warning time period tPartialBrk which are predefined at the time of triggering of the warning to the driver or are only set on the basis of the relative movement situation which is present at this time between the vehicle and the vehicle traveling ahead, the values for the total warning time period tWarning and/or for the first warning time period tWarningSignal and/or the second warning time period tPartialBrk are also adapted after the triggering of the warning to the driver has already taken place, as a function of the relative movement situation which is then respectively present between the vehicle and the vehicle traveling ahead. Such adaptation can be carried out once or at specific time intervals or repeatedly in a cyclical fashion.

For example, in the event of the vehicle which is traveling ahead decelerating after the triggering of the warning to the driver, the values for the total warning time period tWarning and/or for the first warning time period tWarningSignal and/or for the second warning time period tPartialBrk are shortened in comparison with the initial values at the time of the triggering of the warning to the driver on the basis of the relative movement situation which is then present and changed between the vehicle and the vehicle traveling ahead. Otherwise, if, after the triggering of the warning to the driver the vehicle traveling ahead accelerates, the values for the total warning tWarning and/or for the first warning time period tWarningSignal and/or for the second warning time period tPartialBrk are lengthened in comparison with the initial values at the start of the triggering of the warning to the driver, on the basis of the relative movement situation which is then present and changed between the vehicle and the vehicle traveling ahead.

FIG. 2 illustrates the distance from the vehicle traveling ahead with a continuous line, the actual speed of the vehicle with a dot-dash line and the acceleration of the vehicle also with a continuous line.

If, taking the example in FIG. 2, it is assumed that starting from travel of the vehicle at constant speed e.g. $v_0$=60 km/h without acceleration ($a_0$=0 m/s$^2$) it has been detected by the evaluation apparatus at the time $t_0$=−3.0 s that e.g. owing to a decelerating vehicle traveling ahead the determined value for the collision avoidance deceleration aAvoid becomes greater than the emergency braking deceleration axvEmergencyBraking, the warning to the driver is possibly also actuated with an automatically triggered emergency braking process.

On the basis of the relative movement situation, which is present at this time $t_0$ and detected on the basis of the sensor apparatus, between the vehicle and the vehicle traveling ahead, for example the dynamic first warning time period tWarningSignal for the warning to the driver is then determined here and monitored by a timer which is integrated into the evaluation apparatus. If, for example, the distance from the vehicle traveling ahead then decreases further here, e.g. because said vehicle is decelerated further and the driver does not react, during the first warning time period tWarningSignal, to the visual and/or acoustic signals which are initiated by the evaluation apparatus and output by the signal apparatus, the speed and the acceleration of the vehicle remain unchanged during this time phase (warning phase).

If after the expiry of the first warning time period tWarningSignal there has still been no braking intervention on the part of the driver, the evaluation apparatus intervenes at the time t=−2.2 s (at the start of the second warning time period tPartialBrk) by a partial braking operation which is initiated by said apparatus, as a result of which the speed and the distance from the vehicle traveling ahead are reduced. Furthermore, the vehicle experiences a certain partial braking deceleration of, for example, −3 m/s$^2$ during the second warning time period tPartialBrk.

If after the expiry of the second warning time period tPartialBrk there has still been no braking intervention on the part of the driver, the evaluation apparatus intervenes at the time t=−0.8 s (start of the automatic emergency braking process) by a full braking operation initiated by said apparatus, as a result of which the speed and the distance from the vehicle traveling ahead are reduced even further until at the time t=0.0 s a smaller minimum distance to the vehicle traveling ahead which is to be achieved is reached. Furthermore, the vehicle experiences a full braking deceleration of, for example, −6 m/s$^2$ during the second warning time period tPartialBrk.

In the exemplary embodiment of the method explained on the basis of FIG. 2, at the time $t_0$=−3.0 s, at which it is detected that the collision avoidance deceleration aAvoid is greater than the emergency braking deceleration axvEmergencyBraking, a value which corresponds to the relative movement situation which is present at this time $t_0$, between the vehicle and the vehicle traveling ahead, is defined for the first warning time period tWarningSignal. As an alternative to this, the value for the first warning time period tWarningSignal could also be adapted to the current or, in comparison, changing relative movement situation between the vehicle and the vehicle traveling ahead by the evaluation apparatus 4 even after the warning to the driver has been triggered at the time $t^0$=−3.0 s, e.g. if the vehicle traveling ahead is still somewhat decelerated or accelerated during the current first warning time period tWarningSignal. In the first case, the total warning time period tWarning can then be shortened by the evaluation apparatus 4 and in the second case it can be lengthened. Generally, the adaptation of a warning time period tWarning, tWarningSignal and/or tPartialBrk can take place in any desired fashion, that is to say proportionally or even not linearly as a function of the relative movement situation.

The List Of Reference Numbers is as follows:
1 Device
2 Sensor apparatus
4 Evaluation apparatus
6 Comparator

The invention claimed is:

1. A method for triggering an automatic emergency braking process in a vehicle to avoid a tail-end collision with an obstacle, the method comprising:
triggering a warning to a driver if at least one warning condition is satisfied, wherein the satisfaction of the warning condition specifies that owing to an instantaneous driving situation of the vehicle relative to the obstacle the automatic emergency braking process should be triggered, wherein the automatic emergency braking process is not triggered until after the warning to the driver is triggered and a dynamic warning time period has subsequently expired; and
adapting the dynamic warning time period as a function of a relative movement situation, which changes over time, between the vehicle and the obstacle;
wherein the dynamic warning time period includes a first dynamic warning time period and a second dynamic warning time period,
wherein visual and/or acoustic signals are output during the first dynamic warning time period, and a partial braking operation with a partial braking deceleration less than a maximum emergency braking deceleration is carried out within the scope of the second dynamic warning time period which is immediately subsequent to the first dynamic warning time period,
wherein the first dynamic warning time period and the second dynamic warning time period are set and/or adapted as the function of the relative movement situation, which changes over time, between the vehicle and the obstacle,
wherein if the driver reacts within the first dynamic warning time period to bring about a safety distance of the vehicle by providing active braking or steering of the vehicle with respect to a vehicle traveling ahead in a direction of travel and/or transverse with respect thereto, the method is ended,
wherein if the driver does not react within the first dynamic warning time period to bring about the safety distance of the vehicle by providing the active braking or the steering of the vehicle with respect to the vehicle traveling ahead in the direction of travel and/or transverse with respect thereto, the second dynamic warning time period is automatically actuated, and during the second dynamic warning time period, without involvement by the driver, a signal is transmitted to trigger the partial braking operation with the partial braking deceleration at the start of the second dynamic warning time period, and if after the second dynamic warning time period has ended there has been no braking intervention by the driver, then a full braking operation is triggered, and
wherein the dynamic warning time period, which includes the first dynamic warning time period and the second dynamic warning time period, is adapted, as the function of the relative movement situation, which changes over time, between the vehicle and the obstacle, after the triggering of the warning to the driver has already taken place.

2. The method of claim 1, wherein an initial warning time period is set at the time of the triggering of the warning to the driver, based on the relative movement situation which is present between the vehicle and the obstacle at this time, and is then no longer changed.

3. The method of claim 1, wherein, based on an initial warning time period which is predefined at the time of the triggering of the warning to the driver or is only set based on the relative movement situation which is present between the vehicle and the obstacle at this time, the dynamic warning time period is adapted after the triggering of the warning to the driver has already taken place, as a function of the relative movement situation which is then respectively present between the vehicle and the obstacle.

4. The method of claim 3, wherein if the obstacle decelerates after the triggering of the warning to the driver, the dynamic warning time period is shortened in comparison with the initial warning time period based on the relative movement situation which is then present between the vehicle and the obstacle.

5. The method of claim 3, wherein if the obstacle accelerates after the triggering of the warning to the driver, the dynamic warning time period is lengthened in comparison with the initial warning time period, based on the relative movement situation which is then present between the vehicle and the obstacle.

6. The method of claim 1, wherein the dynamic warning time period is set or adapted cyclically, and wherein the first dynamic warning time period specifies that during the dynamic warning time period, the visual and/or acoustic signals are generated to prompt the driver time to intervene, by active braking, by steering, by activating an indicator light, by carrying out kick down activation of an accelerator pedal or by switching off the automatic emergency braking process, and wherein the second dynamic warning time period is a time period during which the signal is transmitted to trigger the partial braking operation with the partial braking deceleration which is less than the maximum emergency braking deceleration.

7. The method of claim 1, wherein at least one of the following variables is taken into account in the relative movement between the vehicle and the obstacle: a speed and/or an acceleration of the vehicle in the direction of travel and/or transverse with respect to the direction of travel; a speed and/or an acceleration of the obstacle in the direction of travel and/or transverse with respect to the direction of travel; a relative speed and/or a relative acceleration between the vehicle and the obstacle in the direction of travel and/or transverse with respect to the direction of travel; and a distance between the vehicle and the obstacle in the direction of travel and/or transverse with respect to the direction of travel.

8. The method of claim 1, wherein the visual and/or acoustic signals are output during the first dynamic warning time period, and wherein the partial braking operation with the partial braking deceleration less than the maximum emergency braking deceleration is carried out within the scope of the second dynamic warning time period which is immediately subsequent to the first dynamic warning time period.

9. The method of claim 8, wherein the first dynamic warning time period and/or the second dynamic warning time period is set as a function of the relative movement situation between the vehicle and the obstacle and/or is adapted as the function of the relative movement situation, which changes over time, between the vehicle and the obstacle.

10. A braking device for carrying out an automatic emergency braking process in a vehicle to avoid a tail-end collision with an obstacle, comprising:
a device configured to perform the following method:
triggering a warning to a driver if at least one warning condition which is stored is satisfied, wherein the satisfaction of the warning condition specifies that owing to an instantaneous driving situation of the vehicle relative to the obstacle the automatic emergency braking process should be triggered, wherein the automatic emergency braking process is not triggered until after the warning to the driver is triggered and a dynamic warning time period has subsequently expired; and
adapting the dynamic warning time period as a function of a relative movement situation, which changes over time, between the vehicle and the obstacle;
wherein the dynamic warning time period includes a first dynamic warning time period and a second dynamic warning time period,
wherein visual and/or acoustic signals are output during the first dynamic warning time period, and a partial braking operation with a partial braking deceleration less than a maximum emergency braking deceleration is carried out within the scope of the second dynamic warning time period which is immediately subsequent to the first dynamic warning time period,
wherein the first dynamic warning time period and the second dynamic warning time period is set and/or adapted as the function of the relative movement situation, which changes over time, between the vehicle and the obstacle,
wherein if the driver reacts within the first dynamic warning time period to bring about a safety distance of the vehicle by providing active braking or steering of the vehicle with respect to a vehicle traveling ahead in a direction of travel and/or transverse with respect thereto, the method is ended,
wherein if the driver does not react within the first dynamic warning time period to bring about the safety distance of the vehicle by providing the active braking or the steering of the vehicle with respect to the vehicle traveling ahead in the direction of travel and/or transverse with respect thereto, the second dynamic warning time period is automatically actuated, during the second dynamic warning time period, without involvement by the driver, a signal is transmitted to trigger the partial braking operation with the partial braking deceleration at the start of the second dynamic warning time period, and if after the second dynamic warning time period has ended there has been no braking intervention by the driver, then a full braking operation is triggered, and
wherein the dynamic warning time period, which includes the first dynamic warning time period and the second dynamic warning time period, is adapted, as the function of the relative movement situation, which changes over time, between the vehicle and the obstacle, after the triggering of the warning to the driver has already taken place.

11. A vehicle, comprising:
a device for carrying out an automatic emergency braking process in the vehicle to avoid a tail-end collision with an obstacle, and being configured to perform the following method:
triggering a warning to a driver if at least one warning condition which is stored is satisfied, wherein the satisfaction of the warning condition specifies that owing to an instantaneous driving situation of the vehicle relative to the obstacle the automatic emergency braking process should be triggered, wherein the automatic emergency braking process is not triggered until after the warning to the driver is triggered and a dynamic warning time period has subsequently expired; and
adapting the dynamic warning time period as a function of a relative movement situation, which changes over time, between the vehicle and the obstacle;
wherein the dynamic warning time period includes a first dynamic warning time period and a second dynamic warning time period,
wherein the visual and/or acoustic signals are output during the first dynamic warning time period, and a partial braking operation with a partial braking deceleration less than a maximum emergency braking deceleration is carried out within the scope of the second dynamic warning time period which is immediately subsequent to the first dynamic warning time period,
wherein the first dynamic warning time period and the second dynamic warning time period is set and/or adapted as the function of the relative movement situation, which changes over time, between the vehicle and the obstacle,
wherein if the driver reacts within the first dynamic warning time period to bring about a safety distance of the vehicle by providing active braking or steering of the vehicle with respect to a vehicle traveling ahead in a direction of travel and/or transverse with respect thereto, the method is ended,
wherein if the driver does not react within the first dynamic warning time period to bring about the safety distance of the vehicle by providing the active braking or the steering of the vehicle with respect to the vehicle traveling ahead in the direction of travel and/or transverse with respect thereto, the second dynamic warning time period is automatically actuated, during the second dynamic warning time period, without involvement by the driver, a signal is transmitted to trigger the partial braking operation with the partial braking deceleration at the start of the second dynamic warning time period, and if after the second dynamic warning time period has ended there has been no braking intervention by the driver, then a full braking operation is triggered, and
wherein the dynamic warning time period, which includes the first dynamic warning time period and the second dynamic warning time period, is adapted, as the function of the relative movement situation, which changes over time, between the vehicle and the obstacle, after the triggering of the warning to the driver has already taken place.

* * * * *